(12) United States Patent
Bente et al.

(10) Patent No.: US 12,492,719 B2
(45) Date of Patent: Dec. 9, 2025

(54) TOLERANCE COMPENSATION DEVICE

(71) Applicant: WITTE Automotive GmbH, Velbert (DE)

(72) Inventors: Jan Christian Bente, Sprockhövel (DE); Jose Luis Gonzalez Losa, Essen (DE); Philip Weinberger, Essen (DE); Sven Lemke, Essen (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 217 days.

(21) Appl. No.: 17/700,137

(22) Filed: Mar. 21, 2022

(65) Prior Publication Data

US 2022/0299051 A1 Sep. 22, 2022

(30) Foreign Application Priority Data

Mar. 22, 2021 (DE) .......................... 102021107048.1
Jun. 24, 2021 (DE) .......................... 102021116374.9
Mar. 10, 2022 (DE) .......................... 102022105689.9

(51) Int. Cl.
  *F16B 5/02* (2006.01)
(52) U.S. Cl.
  CPC .......... *F16B 5/0233* (2013.01); *F16B 5/0283* (2013.01)
(58) Field of Classification Search
  CPC .... F16B 5/0233; F16B 37/041; F16B 37/044; F16B 37/02; F16B 5/0635
  USPC .......................................... 411/546, 174, 175
  See application file for complete search history.

(56) References Cited

U.S. PATENT DOCUMENTS

| 3,669,170 A | * | 6/1972 | Schuster | F16B 37/041 |
| | | | | 411/970 |
| 3,810,069 A | * | 5/1974 | Jaconette, Jr. | F16B 37/041 |
| | | | | 439/97 |
| 4,676,706 A | * | 6/1987 | Inaba | F16B 37/044 |
| | | | | 411/432 |
| 5,339,500 A | * | 8/1994 | Muller | F16B 37/041 |
| | | | | 24/514 |
| 5,423,646 A | | 6/1995 | Gagnon | |

(Continued)

FOREIGN PATENT DOCUMENTS

| CN | 101342888 U | 1/2009 |
| CN | 204403071 U | 6/2015 |

(Continued)

OTHER PUBLICATIONS

European Search Report issued in European Application No. 22162996.7, dated Aug. 4, 2022 (10 pages).

(Continued)

*Primary Examiner* — Flemming Saether
(74) *Attorney, Agent, or Firm* — Wiggin and Dana LLP

(57) ABSTRACT

The invention relates to a tolerance compensation apparatus comprising a base element; a compensation element that is in threaded engagement with the base element and that forms a passage extending in an axial direction for a screw element; a nut into which the screw element can be screwed; and a holding element having a first limb holding the base element, a second limb holding the nut, and a connection section connecting the first and second limbs, wherein the first and second limbs are spaced apart from one another while forming a reception gap for receiving a component.

9 Claims, 10 Drawing Sheets

(56) References Cited

U.S. PATENT DOCUMENTS

| | | | | |
|---|---|---|---|---|
| 6,971,830 | B2* | 12/2005 | Hulin | F16B 5/0635 411/184 |
| 10,557,488 | B2* | 2/2020 | Bräutigam | F16B 5/0233 |
| 10,746,220 | B2* | 8/2020 | Figge | F16B 37/041 |
| 11,111,949 | B2* | 9/2021 | Bräutigam | B60Q 1/045 |
| 11,560,912 | B2* | 1/2023 | Wolf | F16B 5/0233 |
| 11,566,649 | B2* | 1/2023 | Gagliardi | F16B 37/044 |
| 11,761,468 | B2* | 9/2023 | Buczynski | F16B 37/02 411/433 |
| 2005/0036851 | A1* | 2/2005 | Dang | E03B 7/095 411/175 |
| 2006/0226312 | A1 | 10/2006 | Masuch | |
| 2015/0330427 | A1* | 11/2015 | Johnson | F16B 5/0233 411/34 |
| 2019/0293099 | A1* | 9/2019 | Pitt | F16B 5/0233 |
| 2022/0065284 | A1* | 3/2022 | Li | F16B 37/042 |
| 2022/0176874 | A1* | 6/2022 | Bräutigam | F16B 37/043 |

FOREIGN PATENT DOCUMENTS

| | | |
|---|---|---|
| CN | 211009412 U | 7/2020 |
| DE | 10300991 A1 | 7/2004 |
| DE | 102009024363 A1 | 12/2010 |
| DE | 10034968 B4 | 3/2014 |
| DE | 102015104963 A1 | 10/2015 |
| DE | 102018201496 A1 | 8/2019 |
| DE | 102018130391 A1 | 6/2020 |
| DE | 10362429 B3 | 9/2020 |
| DE | 202019103624 U1 | 10/2020 |
| TW | 488502 U | 5/2002 |
| WO | 2018010738 A1 | 1/2018 |

OTHER PUBLICATIONS

Office Action issued in German Application No. 102022105689.9, dated Mar. 21, 2023 (3 pages).

Office Action issued for corresponding German Application No. 10 2022 105 689.9 dated May 13, 2025.

China National Intellectual Property Administration, First Office Action and Search Report, Application No. 2022102865922, Issue date: Sept. 3, 2025.

* cited by examiner

TOLERANCE COMPENSATION DEVICE

CROSS-REFERENCE TO RELATED APPLICATIONS

This application claims benefit under 35 U.S.C. § 119 to German application Nos. DE 102022105689.9, filed Mar. 10, 2022; DE 102021116374.9, filed Jun. 24, 2021; and DE 102021107048.1, filed Mar. 22, 2021. The contents of each of the above-identified applications are incorporated herein by reference in their entirety.

TECHNICAL FIELD AND BACKGROUND

The invention relates to a tolerance compensation apparatus comprising a base element; a compensation element that is in threaded engagement with the base element and that forms a passage extending in an axial direction for a screw element; a nut into which the screw element can be screwed; and a holding element having a first limb holding the base element, a second limb holding the nut, and a connection section connecting the first and second limbs, wherein the first and second limbs are spaced apart from one another while forming a reception gap for receiving a component.

In a known tolerance compensation apparatus of this kind, the nut is inserted into the second limb in a direction transverse to the axial direction, i.e. so-to-say radially inserted into the second limb, via a recess of the second limb that is located in the region of a front end of the second limb facing away from the connection section. Furthermore, the holding element of this known tolerance compensation apparatus is to have high rigidity and a low degree of deformability.

BRIEF SUMMARY

It is the underlying object of the invention to provide a tolerance compensation apparatus of the initially named kind that is characterized by a higher economy.

This object is satisfied, on the one hand, by a tolerance compensation apparatus having the features as described and claimed and in particular in that the reception gap has a main region having a first maximum width and an end region that faces the connection section and that has a second maximum width that is greater than the first maximum width. The widened end region of the reception gap ultimately ensures that the connection section is tapered over a greater length viewed in the axial direction, whereby the connection section can be more easily bent and the width of the main region of the reception gap can be more easily adapted to the thickness of the component to be received therein.

On the other hand, the object is satisfied by a tolerance compensation apparatus having the features as described and claimed and in particular in that the second limb surrounds the nut such that the nut can be inserted into the second limb only in the axial direction. In accordance with the invention, the nut is therefore not inserted radially from the front into the second limb, i.e. the second limb does not have to be open at its front end facing away from the connection section. Consequently, the nut cannot fall out of the second limb and be lost, e.g. during a transport of the tolerance compensation apparatus to its assembly site. For example, the nut can be inserted through the first limb, so-to-say from above, into the second limb. It is understood that, for this purpose, the first limb has to have a sufficiently large passage through which the nut can be guided. Ideally, the passage satisfies a dual function in that it serves to receive the base element after the insertion of the nut into the second limb.

It is understood that the design in accordance with the invention of the reception gap and the embedding in accordance with the invention of the nut into the second limb can be combined, i.e. can be implemented in one and the same tolerance compensation apparatus.

Advantageous embodiments of the invention can be seen from the dependent claims, from the description, and from the drawing.

In accordance with an embodiment, the main region of the reception gap extends in a plane that is oriented transversely and in particular at a right angle to the axial direction. The end region of the reception gap can, in contrast, extend in the axial direction. As a result, the reception gap can, for example, have a T shape or an L shape viewed in a longitudinal section. In this context, the longitudinal section is defined as a section through the tolerance compensation apparatus in a plane that extends in the axial direction and from the connection section toward the front ends of the limbs facing away from the connection section.

In accordance with a further embodiment, the second limb completely surrounds the nut in a plane oriented at a right angle to the axial direction. This contributes to the nut not being able to radially fall out of or be radially removed from the second limb.

In accordance with yet a further embodiment, the nut is guided in the second limb such that it can be moved in only one direction within a plane extending at a right angle to the axial direction. In other words, the nut therefore has play in only one direction, for example, in the direction in which the tolerance compensation apparatus is pushed onto the component. This makes it possible to compensate tolerances in the positioning of a bore provided in the component for the screw element.

A contribution is made to an even higher economy of the tolerance compensation apparatus if the holding element is formed from a plastic material.

Furthermore, the holding element can be manufactured particularly cost-effectively if it is formed in one piece, for example, as an injection-molded part.

Alternatively, the holding element can be formed in multiple parts. For example, the connection section can be formed by two separate connection part sections, in particular wherein the one connection part section merges into the first limb and the other connection part section merges into the second limb.

For a better adaptation of the width of the reception gap to the thickness of the component to be received, the connection part sections can be displaceable, in particular unidirectionally displaceable, in the axial direction relative to one another.

For example, the connection part sections can be in contact with one another via a sawtooth latching.

In accordance with a further embodiment, the tolerance compensation apparatus has at least one securing element by which a component received in the reception gap can be secured to the tolerance compensation apparatus. In this respect, this aspect can not only be implemented in combination with the features described above, but also represents an independent inventive idea. A further subject of the invention is therefore a tolerance compensation apparatus having the features as described and claimed.

For example, a securing element can be arranged in an entry region of the reception gap and/or a securing element can be arranged in an end region of the reception gap. Furthermore, a securing element can extend starting from the first limb into the reception gap and/or a securing element can extend starting from the second limb into the reception gap.

The securing element can, for example, comprise a latching tongue that is configured to cooperate with a latch projection formed at the component, and/or to cooperate with a surface section of the component, and/or to engage into a latch opening formed in the component.

The latching tongue can in particular be elastic and can have a free end facing in the direction of the connection section so that the latching tongue is deflected by the latch projection of the component on the introduction of the component into the reception gap and can latch in behind the latch projection on a reaching of an end position of the component in the reception gap. Alternatively or additionally, the free end of the latching tongue can latch into a latch opening of the component.

In addition, the latching tongue can be elastic and can have a free end that faces in the direction of the connection section and that, when the component is in an end position in the reception gap, is deflected by a surface section of the component. Due to the deflected latching tongue, the component is urged in the axial direction, whereby the effect of a securing element arranged at the oppositely disposed side of the component can be improved, for example, the interaction between a latching tongue arranged at the oppositely disposed side of the component and the latch projection of the component.

The securing element can also comprise a latching wedge that is configured to engage into a latch opening of the component. The latching wedge can in particular be elastic and/or can have a profile that tapers in the axial direction to facilitate the dipping into the latch opening.

An insert that serves to cooperate with the latching tongue and/or the latching wedge can be attached to the component.

In accordance with a further embodiment, the securing element can also be formed by two spaced-apart connection webs of the connection section and can be configured to receive a latching anchor of the component and to secure said latching anchor by latching in. Specifically, the connection webs can define a window that serves as a latch opening for the latching anchor.

BRIEF DESCRIPTION OF THE DRAWINGS

The invention will be described in the following purely by way of example with reference to possible embodiments and to the enclosed drawings. There are shown.

DETAILED DESCRIPTION

Figure 1A:
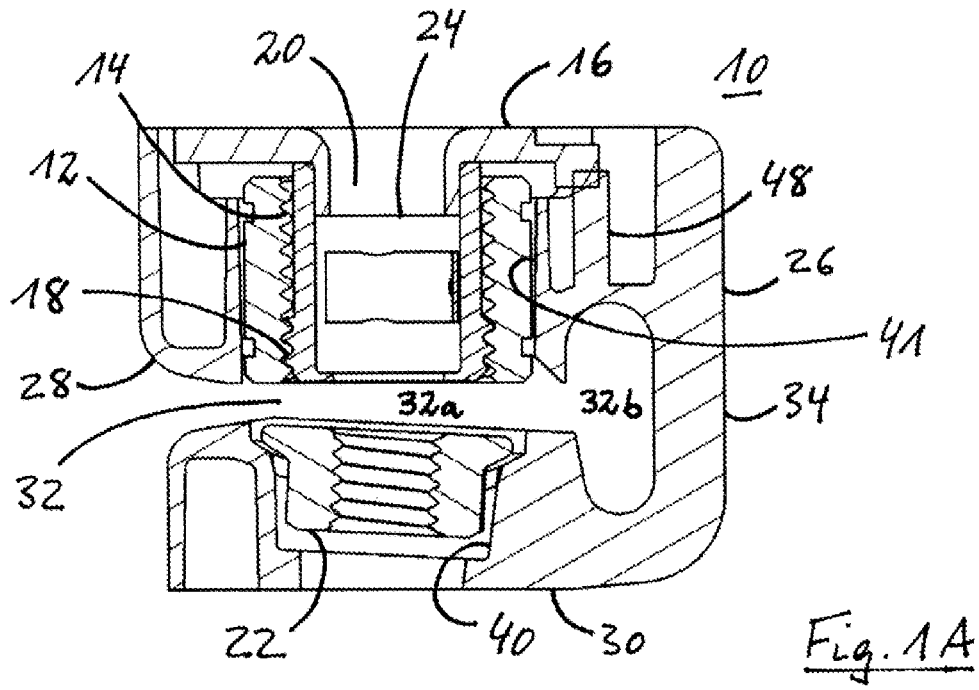
FIG. 1A a longitudinal sectional view of a first embodiment of a tolerance compensation apparatus.

A first embodiment of a tolerance compensation apparatus 10 is shown in FIGS. 1A to 1D. The tolerance compensation apparatus 10 comprises a hollow cylindrical base element 12 that forms an internal thread 14. A compensation element 16, which is likewise hollow cylindrical, is screwed into the base element 12 and has an external thread 18 for this purpose. The longitudinal central axes of the internal thread 14 and the external thread 18 define an axial direction.

The compensation element 16 forms a passage 20 which extends in the axial direction and through which a screw element, not shown in the Figures, for example a screw or a threaded bolt, can be guided to be screwed into a nut 22 of the tolerance compensation apparatus 10.

The orientations of the internal thread 14 and the external thread 18, on the one hand, and of the threads of the screw element and the nut 22, on the other hand, are formed in opposite senses so that the compensation element 16 rotates out of the base element 12 on the screwing of the screw element into the nut 22 in order to bridge a spacing between two components to be connected to one another. For example, the screw element and the nut 22 can each have a right-hand thread, while the internal thread 14 and the external thread 18 are left-hand threads, or vice versa. To transmit torque from the screw element to the compensation element 16, a spring element 24 is arranged in the passage 20 and is in force-fitting engagement with the screw element extending through the passage 20 and with the compensation element 16.

Both the base element 12 and the nut 22 are held in a holding element 26 of the tolerance compensation apparatus 10. The holding element 26 is formed in one piece from a plastic material and has a first limb 28 for receiving the base element 12 and a second limb 30 for receiving the nut 22.

The first limb 28 and the second limb 30 are axially spaced apart from one another while forming a reception gap 32 and are connected to one another by an axially extending connection section 34. A plurality of axially extending grooves 36 are formed at a rear side of the connection section 34 facing away from the limbs 28, 30 in order to avoid an unnecessary material accumulation. It is understood that these grooves 36 can also extend at a right angle to the axial direction or can even extend obliquely to the axial direction and can intersect.

The reception gap 32 serves to receive a component 38, for example a body panel or a support structure, that is to be connected to another component, not shown in the Figures, that is located above the compensation element 16. The reception gap 32 has a main region 32a extending substantially at a right angle to the axial direction and an end region 32b adjoining the main region 32a and adjacent to the connection section 34. The end region 32b extends at both sides of the main region 32a in the axial direction, i.e. upwardly and downwardly in FIGS. 1A and 1B, whereby the reception gap 32 has the shape of a horizontal T viewed in the longitudinal section. However, a reception gap 32 in the shape of a horizontal L would also be conceivable, in which case the end region 32b would axially extend in only one direction starting from the main region 32a, i.e. either upwardly or downwardly.

The width of the main region 32a of the reception gap 32 does not necessarily have to be constant. Thus, the main region 32a can, for example, widen in the direction of the free ends of the limbs 28, 30, i.e. to the left in FIGS. 1A and 1B, to facilitate the pushing of the tolerance compensation apparatus 10 onto the component 38. In addition, the main region 32a can also widen slightly in the direction of the end region 32b. In each case, the maximum width of the main region 32a, i.e. the largest extent of the main region 32a viewed in the axial direction, is significantly smaller than the maximum width of the end region 32b, i.e. than the largest extent of the end region 32b viewed in the axial direction. The maximum width of the end region 32b can in particular be two to three times as large as the maximum width of the main region 32a.

The nut 22 is a hexagonal flange nut that is embedded in a hexagonal recess 40 of the second limb 30 adapted to said hexagonal flange nut. Viewed in the plane of the second limb 30, the nut 22 is completely surrounded by the second limb 30 so that the nut 22 cannot fall out of the second limb 30 to the front or the rear or to the side. A falling out in the direction of the first limb 28, i.e. upwardly in FIGS. 1A to 1C, is also not possible since the maximum width of the reception gap 32 in the region of the nut 22, i.e. therefore the maximum width of the main region 32a, is less than the axial dimension of the nut 22.

Accordingly, the nut 22 can be inserted into the recess 40 only in the axial direction. In the embodiment shown in FIGS. 1A to 1D, the embedding of the nut 22 in the recess 40 takes place prior to the insertion of the base element 12 into the first limb 28, and indeed through a receiver 41 of the first limb 28 for the base element 12. It is understood that the receiver 41 has to be dimensioned so large that the nut 22 fits through it. Only after the embedding of the nut 22 in the recess 40 is the base element 12 then inserted into the receiver 41 and fixed therein in a form-fitting, force-fitting, or bonded manner, for example, by a clipping in, a latching, or an adhesive bonding.

Figure 1B:
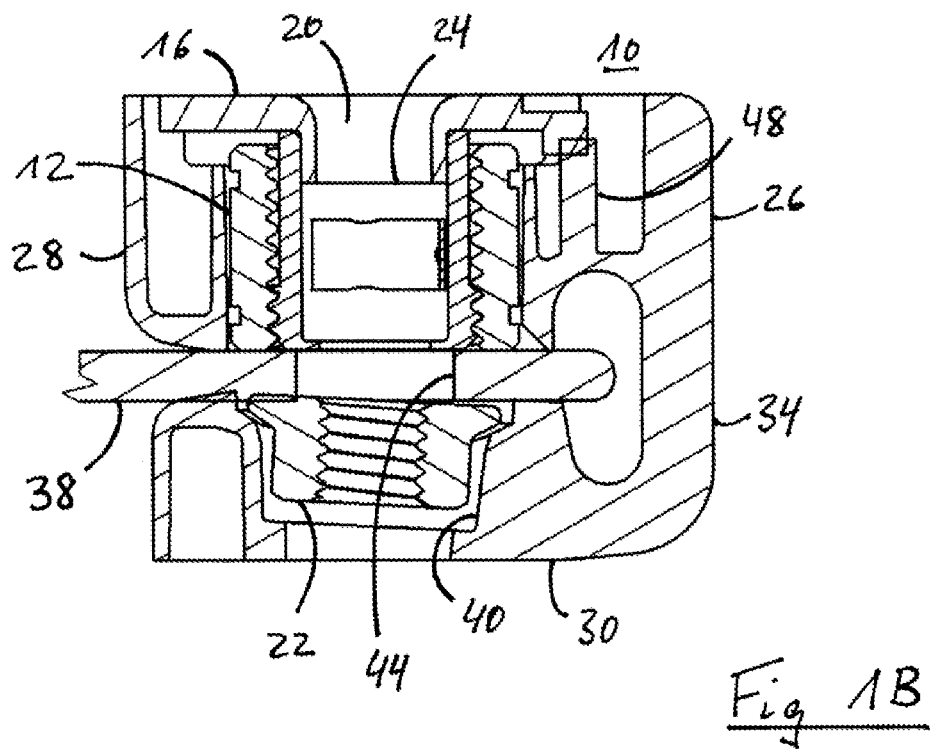
FIG. 1B a longitudinal sectional view of the tolerance compensation apparatus of FIG. 1A with a component received therein.
Figure 1C:
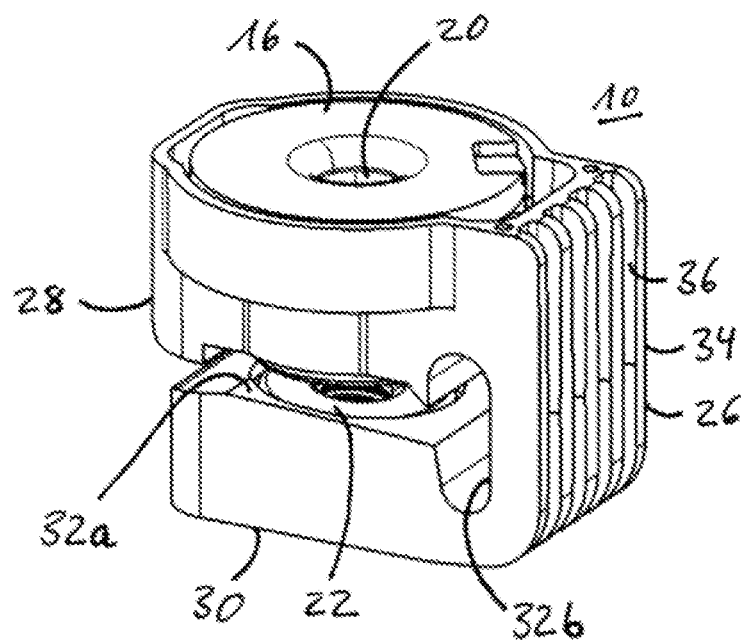
FIG. 1C a perspective view of the tolerance compensation apparatus of FIG. 1A.
Figure 1D:
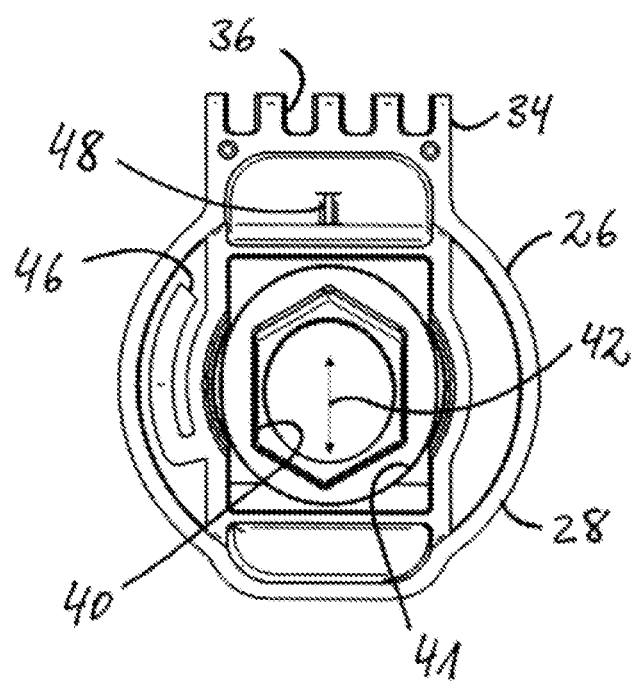
FIG. 1D a plan view of a holding element of the tolerance compensation device of FIG. 1A.

As FIG. 1D shows, the recess 40 is not formed in the shape of a regular hexagon, but is somewhat stretched in a radial direction, more specifically in a direction from the connection section 34 toward the free ends of the limbs 28, 30, indicated in FIG. 1D by the arrow 42. A certain movement of the nut 22 in the direction of the arrow 42, and indeed only in this direction, is hereby possible. The nut 22 therefore has some play in the recess 40 in the direction of the arrow 42, which facilitates the alignment of the nut 22 with a bore 44 provided in the component 38 and with the screw element and thus the positioning of the tolerance compensation apparatus 10 at the component 38 on the whole.

In FIGS. 1A to 1C, the tolerance compensation apparatus 10 is shown in an initial or transport state in which the tolerance compensation apparatus 10 is delivered to an assembly site. In this state, the compensation element 16 is almost completely rotated into the base element 12. To prevent that the compensation element 16 can be rotated too far into the base element 12 and can jam therein, the holding element 26 forms an end abutment 46 (FIG. 1D) that limits the turning-in movement of the compensation element 16. In addition, the holding element 26 forms a spring tongue 48 that is in engagement with the compensation element 16, which is in the initial state, to prevent an unintentional rotation of the compensation element 16 out of the base element 12. The spring tongue 48 consequently forms a transport securing device. It is understood that the spring tongue 48 is dimensioned such that the compensation element 16 can overcome and can detach from the spring tongue 48 while applying a sufficiently large torque, in particular when the screw element is guided through the compensation element 16 and exerts a torque on the compensation element 16 via the spring element 24 on the screwing into the nut 22.

Figure 2A:
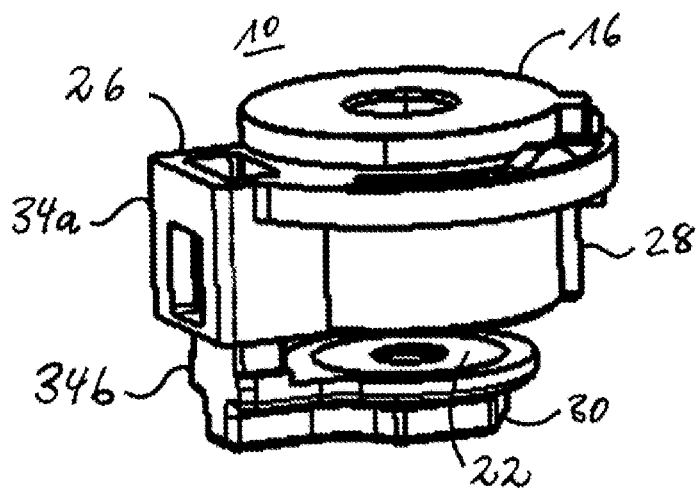
FIG. 2A a perspective view of a second embodiment of a tolerance compensation apparatus.
Figure 2B:
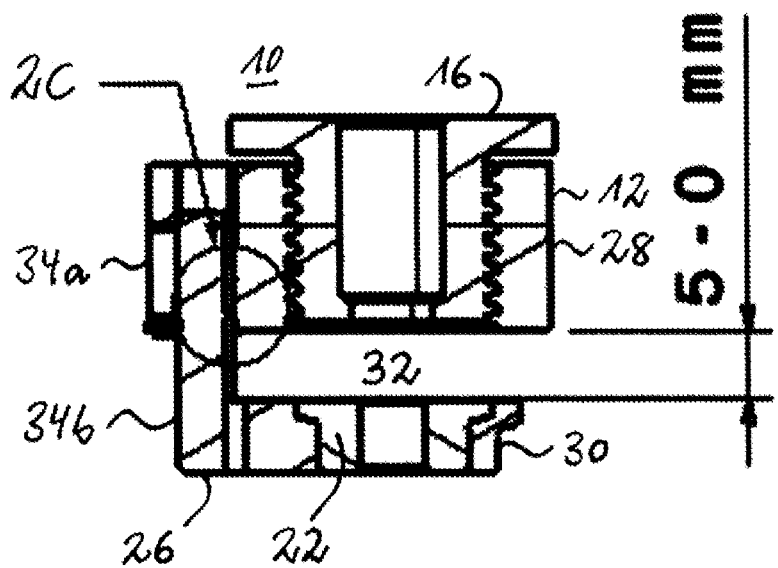
FIG. 2B a longitudinal sectional view of the tolerance compensation apparatus of FIG. 2A.
Figure 2C:
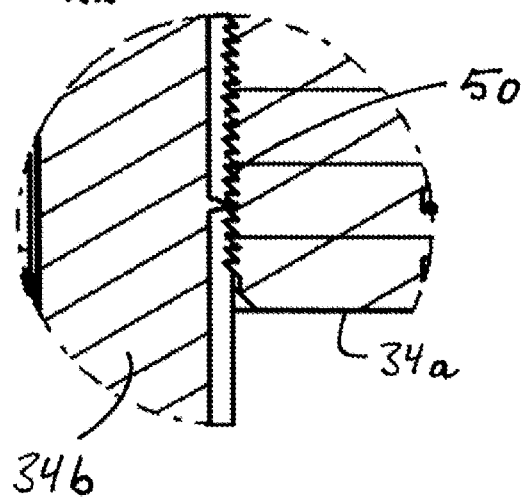
FIG. 2C a detail view of FIG. 2B.
Figure 3A:
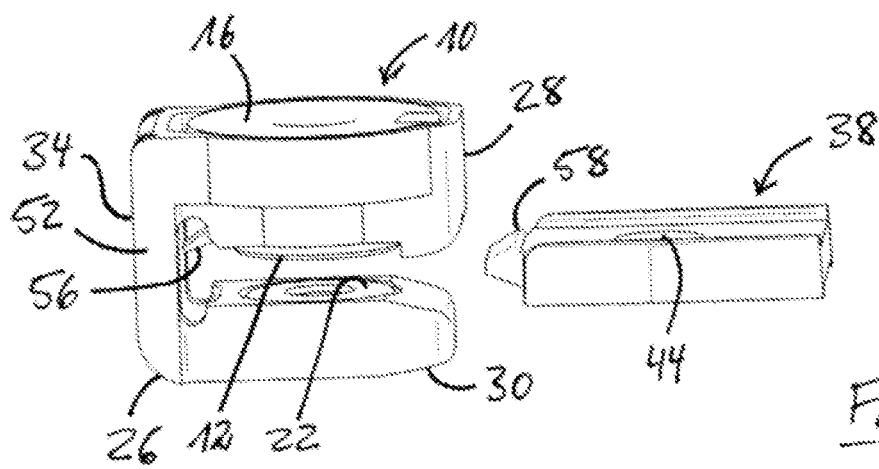
FIG. 3A a perspective view of a third embodiment of a tolerance compensation apparatus and a component to be received therein.
Figure 3B:
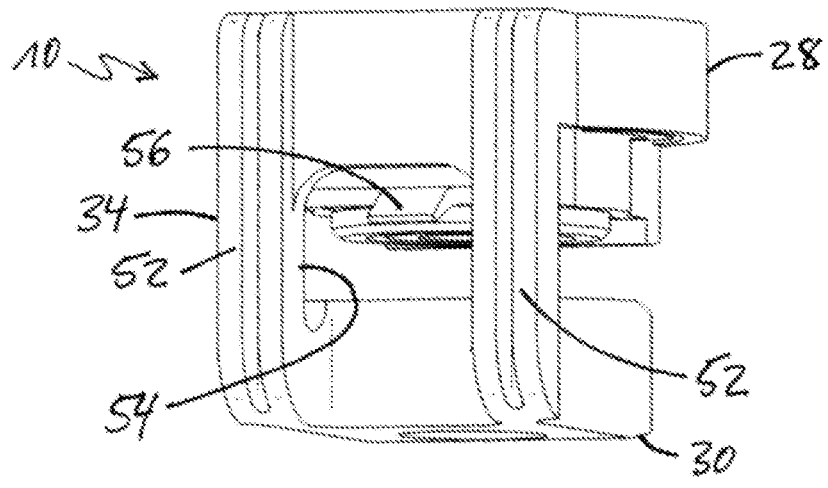
FIG. 3B a perspective rear view of the tolerance compensation apparatus of FIG. 3A.
Figure 3C:
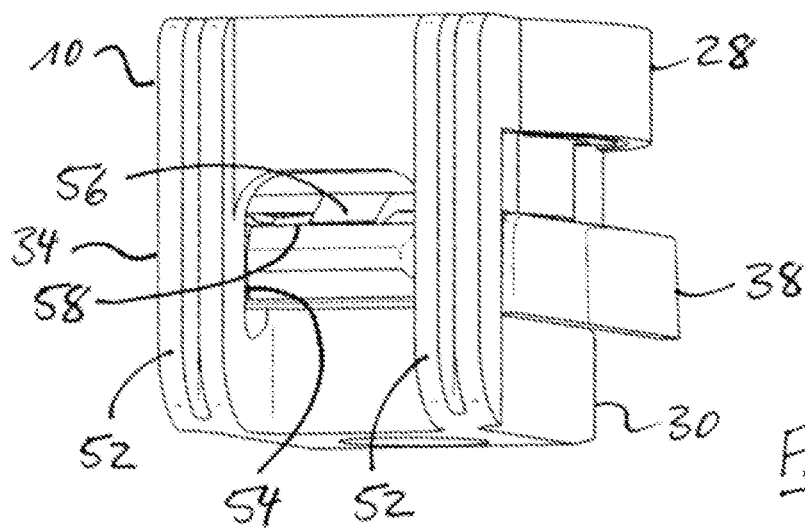
FIG. 3C a perspective rear view of the tolerance compensation apparatus of FIG. 3A with a component received therein.
Figure 3D:
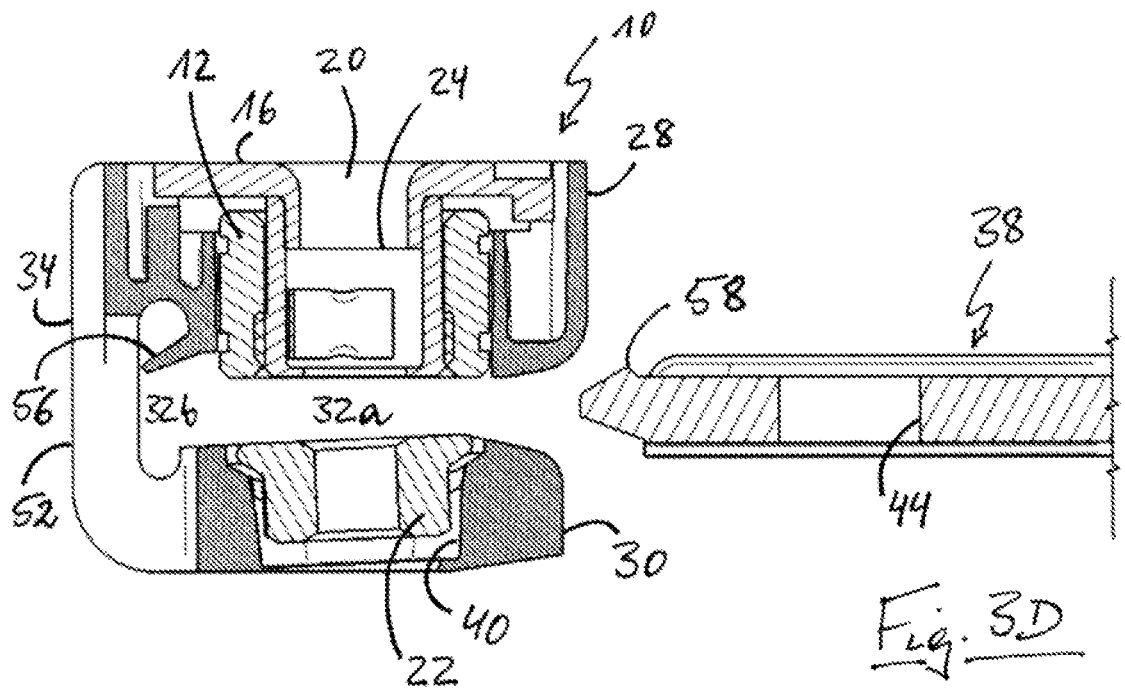
FIG. 3D a longitudinal sectional view of the tolerance compensation apparatus and the component to be received of FIG. 3A.
Figure 3E:
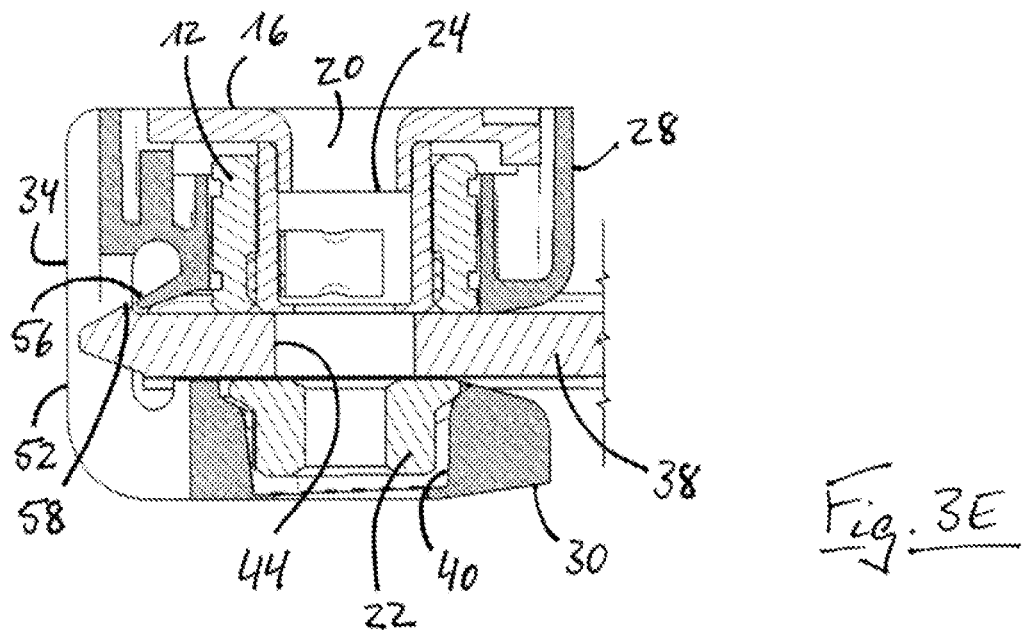
FIG. 3E a longitudinal sectional view of the tolerance compensation apparatus of FIG. 3A with a component received therein.

In FIGS. 2A to 2C, a second embodiment of a tolerance compensation apparatus 10 is shown that substantially differs from the above-described first embodiment in the design of the holding element 26.

Thus, on the one hand, the first limb 28 of the holding element 26 of the second embodiment itself forms the base element 12, i.e. the compensation element 16 is directly in threaded engagement with the first limb 28 of the holding element 26.

On the other hand, the holding element 26 of the second embodiment is formed in two parts. More precisely, the connection section 34 is here composed of a first connection part section 34a and a separate second connection part section 34b, wherein the first connection part section 34a merges into the first limb 28 and the second connection part section 34b merges into the second limb 30.

The first connection part section 34a and the second connection part section 34b are in engagement via a sawtooth latching 50 that makes it possible to unidirectionally displace the first connection part section 34a and the second connection part section 34b in the axial direction relative to one another, namely such that the limbs 28, 30 are moved toward one another. Thus, the limbs 28, 30 can have a maximum spacing from one another in a pre-assembly state and, after the pushing of the tolerance compensation apparatus 10 onto the component 38, can be pushed together until the component 38 is received without play in the reception gap 32. In this way, the width of the reception gap 32 can be easily adapted to components 38 of different thicknesses. Depending on the specific design of the connection part sections 34a, 34b and of the sawtooth latching 50 provided thereat, the width of the reception gap 32 can, for example, be varied in a range from 0 mm to 5 mm or even beyond.

In FIGS. 3A to 3E, a third embodiment of a tolerance compensation apparatus 10 is shown that differs from the first embodiment, on the one hand, in that the connection section 34 of the holding element 26 is not formed with a full wall here, but by two connection webs 52 that are spaced apart in parallel and that define a window 54 between them that provides access to the reception gap 32 from the rear side of the tolerance compensation apparatus 10.

On the other hand, the third embodiment shown in FIGS. 3A to 3E of the tolerance compensation apparatus 10 differs from the first embodiment in that a securing element is provided for securing the component 38 received in the reception gap 32.

The securing element is, for example, an elastic latching tongue 56 that projects from the first limb 28 and that extends obliquely downwardly into the end region 32b of the reception gap 32 in the direction of the connection section 34, more precisely in the direction of the window 54.

Accordingly, a latch projection 58 facing the latching tongue 56, i.e. facing upwardly in the direction of the first limb 28, is formed in the region of the front end of the component 38 provided for the introduction into the reception gap 32.

The latching tongue 56 and the latch projection 58 are adapted to one another such that, on the introduction of the component 38 into the reception gap 32, the latching tongue 56 is deflected by the latch projection 58 in the direction of the first limb 28, i.e. upwardly in the Figures, and as soon as the component 38 reaches its end position in the reception gap 32, i.e. is therefore completely received in the tolerance compensation apparatus 10, the latching tongue 56 snaps back behind the latch projection 58 to engage behind the latter and thereby to secure the component 38 against an unintentional movement out of the tolerance compensation apparatus 10.

In this state, the front end region of the component 38 forming the latch projection 58 projects into the window 54 defined by the connection webs 52.

Variants of a fourth embodiment of a tolerance compensation apparatus 10 are shown in FIGS. 4A to 4D, the fourth embodiment substantially differing from the above-described second embodiment by comprising, in addition to the first latching tongue 56 already mentioned, a second latching tongue 57 that projects from the second limb 30 and that extends obliquely upwardly into the end region 32b of the reception gap 32 in the direction of the connection section 34, more precisely in the direction of the window 54, so that said second latching tongue 57 is deflected in the direction of the second limb 30, i.e. downwardly in the Figures, on the introduction of the component 38 into the reception gap 32.

Figure 4A:
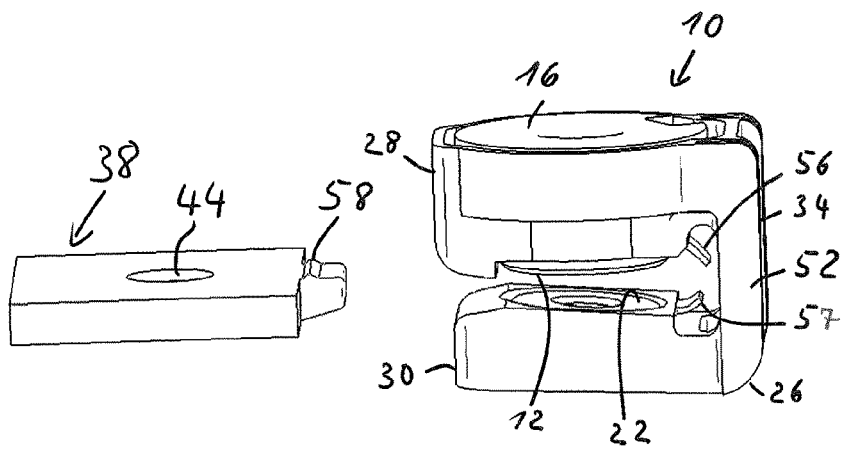
FIG. 4A a perspective view of a fourth embodiment of a tolerance compensation apparatus and a component to be received therein.
Figure 4B:
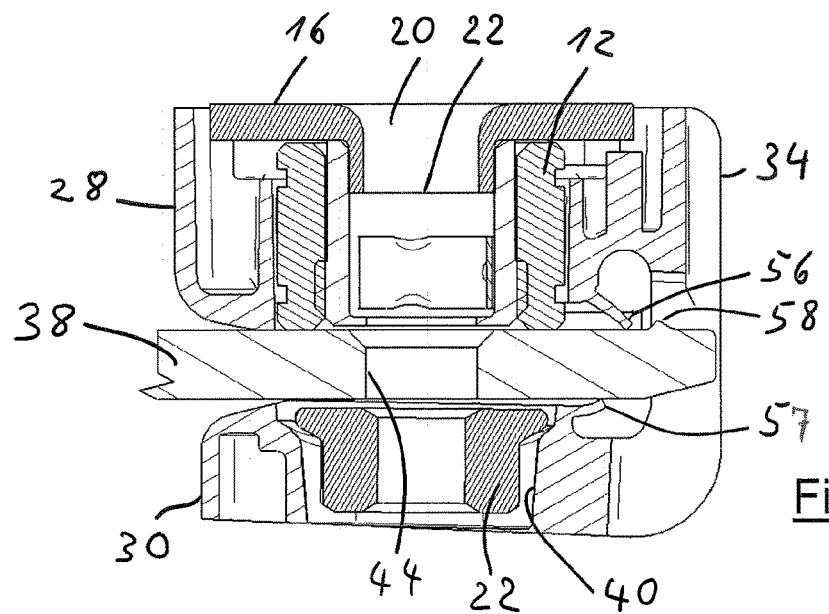
FIG. 4B a longitudinal sectional view of the tolerance compensation apparatus of FIG. 4A with a component received therein.

Depending on the configuration of the component 38, the deflected second latching tongue 57 can thus press the component in the axial direction in the direction of the first limb 28, i.e. upwardly in FIG. 4B, whereby the interaction between the first latching tongue 56 and the latch projection 58 of the component 38 and consequently the securing of the component 38 in the tolerance compensation apparatus 10 are improved.

Figure 4C:
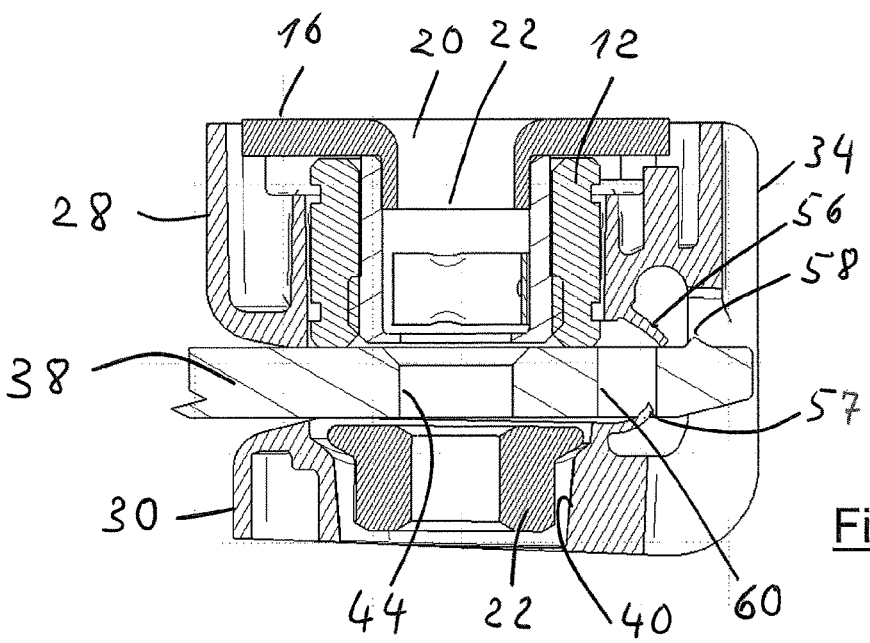
FIG. 4C a longitudinal sectional view of the tolerance compensation apparatus of FIG. 4A with a component received therein.

Alternatively, as shown in FIG. 4C, the component 38 can have a latch opening 60 into which the second latching tongue 57 can engage to additionally secure the component 38 in the tolerance compensation apparatus 10.

Figure 4D:
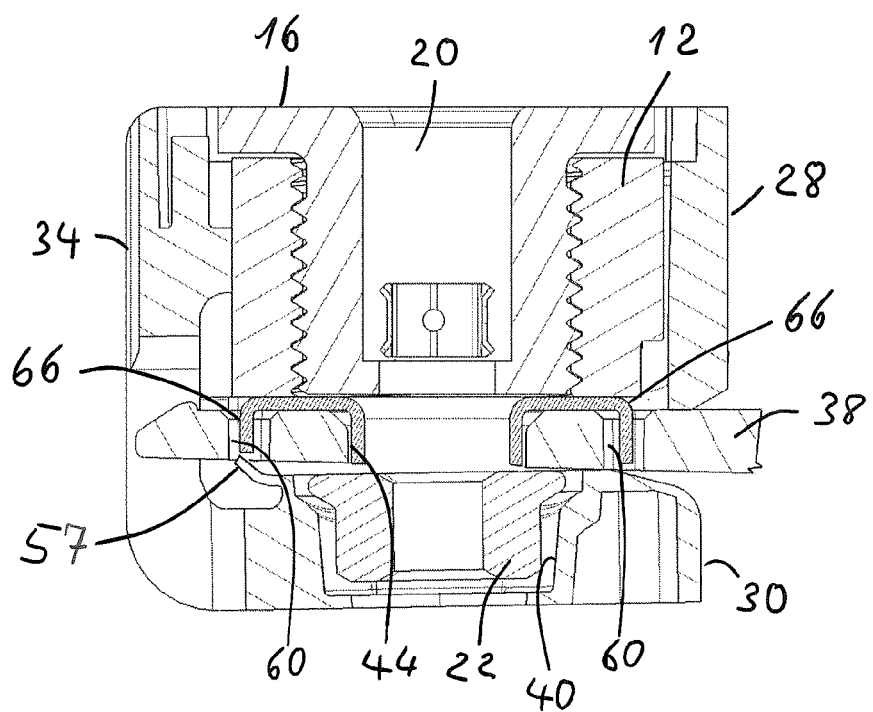
FIG. 4D a longitudinal sectional view of a variant of the tolerance compensation apparatus of FIG. 4A with a component received therein.

Furthermore, at least one insert 66 can be attached to the component 38 (FIG. 4D). The insert 66 can have a substantially U-shaped cross-sectional profile comprising a base and two oppositely disposed side walls that have the same or different lengths and that are connected substantially at a right angle to the base. The insert 66 can be produced from metal or plastic.

The insert 66 can be dimensioned such that its one sidewall projects into a latch opening 60 of the component 38 and the other sidewall projects into the bore 44 of the component 38, while the base of the insert 66 contacts an upper side of the component 38. The insert 66 thus provides a regional increase in the thickness of the component 38 that, on the one hand, results in a stronger clamping of the component 38 in the tolerance compensation apparatus 10 and, on the other hand, favors the latching of the second latching tongue 57 in the latch opening, whereby the securing of the component 38 in the tolerance compensation apparatus 10 is improved even further.

Figure 5A:
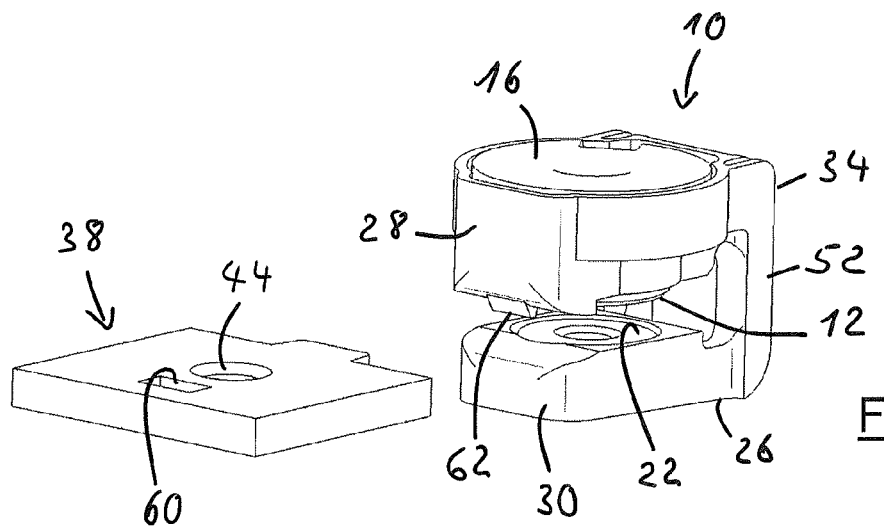
FIG. 5A a perspective view of a fifth embodiment of a tolerance compensation apparatus and a component to be received therein.
Figure 5B:
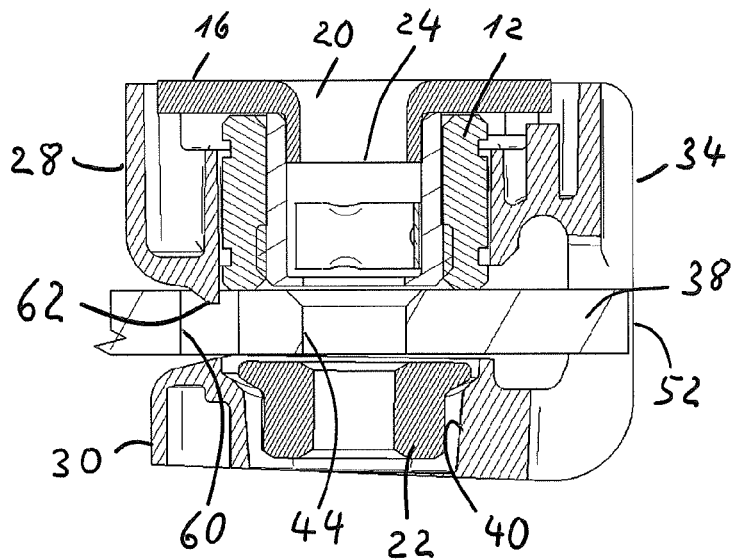
FIG. 5B a longitudinal sectional view of the tolerance compensation apparatus of FIG. 5A with the component received therein.
Figure 5C:
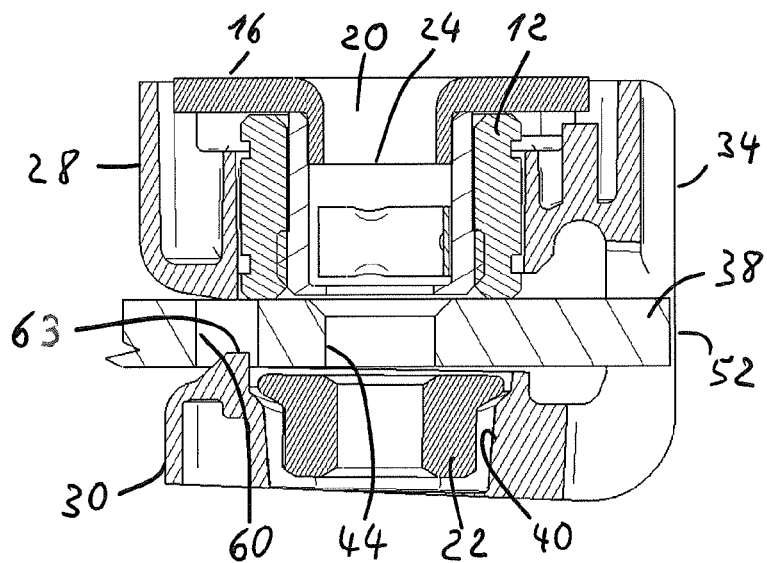
FIG. 5C a longitudinal sectional view of a variant of the tolerance compensation apparatus of FIG. 5A with a component received therein.
Figure 5D:
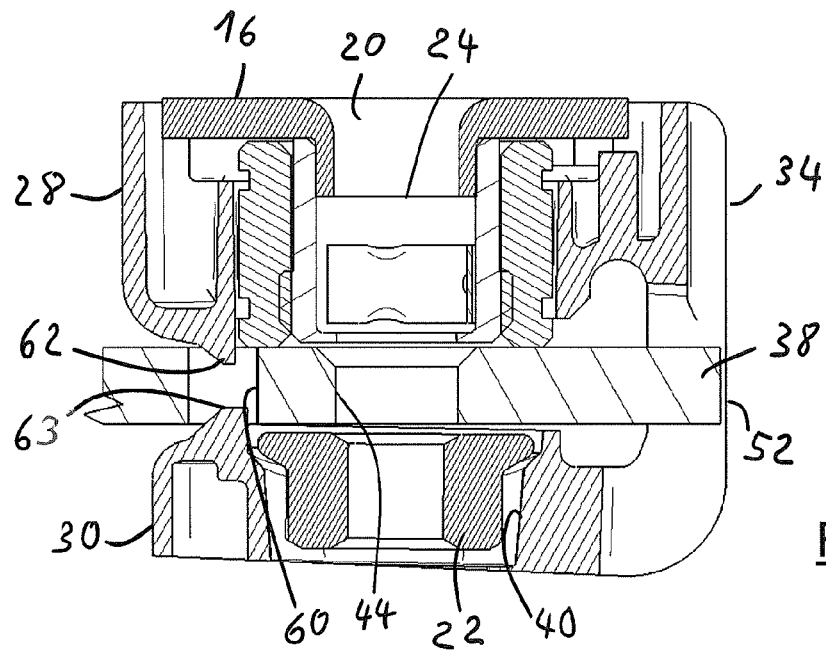
FIG. 5D a longitudinal sectional view of a further variant of the tolerance compensation apparatus of FIG. 5A with a component received therein.

Variants of a fourth embodiment of a tolerance compensation apparatus 10 are shown in FIGS. 5A to 5E, the fourth embodiment substantially differing from the above-described second and third embodiments in that the securing element comprises a latching wedge 62, 63. The securing element can in particular comprise a first latching wedge 62, which projects from the first limb 28 and which extends downwardly into the reception gap 32 in the drawings (FIGS. 5A and 5B), or a second latching wedge 63 that projects from the second limb 30 and that extends upwardly into the reception gap 32 in the drawings (FIG. 5C). A variant is also conceivable that has both such a first latching wedge 62 and such a second latching wedge 63 (FIG. 5D).

The respective latching wedge 62, 63 is configured to engage into a latch opening 60 formed in the component 38 and/or to cooperate with an insert 66 attached to the component 38.

The respective latching wedge 62, 63 can in particular be flexible and have a cross-sectional profile that tapers downwardly or upwardly starting from the first limb 28 or the second limb 20, wherein a straight side surface of the latching wedge 62 is located at a side of the latching wedge 62, 63 facing the connection section 34 and a slanted side surface of the latching wedge 62, 63 is located at a side of the latching wedge 62, 63 facing away from the connection section 34, i.e. at a side facing the entry region of the reception gap 32. In addition, the latching wedge 62, 63 can be designed such that a substantial part of the latching wedge 62, 63 projects into the reception gap 32 so that, as soon as the component 38 reaches its end position in the reception gap 32, a section of the straight side surface of the latching wedge 62, 63 and a section of a side wall of the latch opening 60 are in contact. This enables a particularly reliable securing of the component 38 in the reception gap 32 of the tolerance compensation apparatus 10.

The flexibility of the latching wedge 62, 63 and/or the volume portion of the latching wedge 62, 63 that projects into the reception gap 32 is/are preferably selected such that both a problem-free introduction of the component 38 into the reception gap 32 and a secure wedging between the latch opening 60 and the latching wedge 62, 63 can be ensured.

Figure 5E:
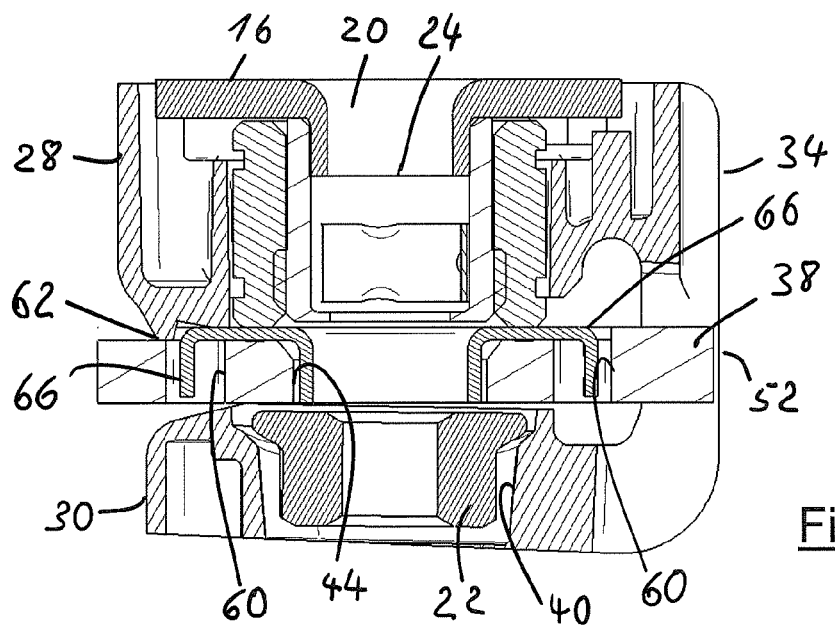
FIG. 5E a longitudinal sectional view of a further variant of the tolerance compensation apparatus of FIG. 5A with a component received therein.

In a case in which an insert 66 described above is attached to the component 38, the latching wedge 62, 63 can have a notch at its side facing the connection section 34, said notch having a cross-sectional profile widening in the direction of the reception gap 32 (FIG. 5E). More precisely, the notch comprises a side surface facing the connection section 34 and a side surface facing away from the connection section 34.

Accordingly, when the component 38 reaches its end position in the reception gap 32, a section of the side surface of the notch facing the connection section 34 and a surface section of the side wall of the insert 66 located in the latch opening 60 can be in contact and a section of the side surface of the notch facing away from the connection section 34 and a surface section of the base of the insert 66 can be in contact. The above-described stronger clamping of the component 38 in the tolerance compensation apparatus 10 due to the attachment of the insert 66 to the component 38 and the additional wedging between the insert 66 and the latching wedge 62, 63 enables an even more secure fixing of the component 38 in the reception gap 32 of the tolerance compensation apparatus 10.

The notch can in particular have an asymmetric cross-sectional profile, i.e. an angle between the axial direction and the side surface facing the connection section 34 can be smaller than an angle between the axial direction and the side surface facing away from the connection section 34. In other words, the side surface facing away from the connection section 34 can be of flatter shape than the side surface facing the connection section 34. This enables an easier introduction of the component 38 into the reception gap 32. In addition, in the latched-in state of the component 38 in the reception gap 32, the contact surface between the notch and the insert 66 can be increased, which in turn provides an improved wedging between the insert 66 and the latching wedge 62, 63.

Figure 6A:
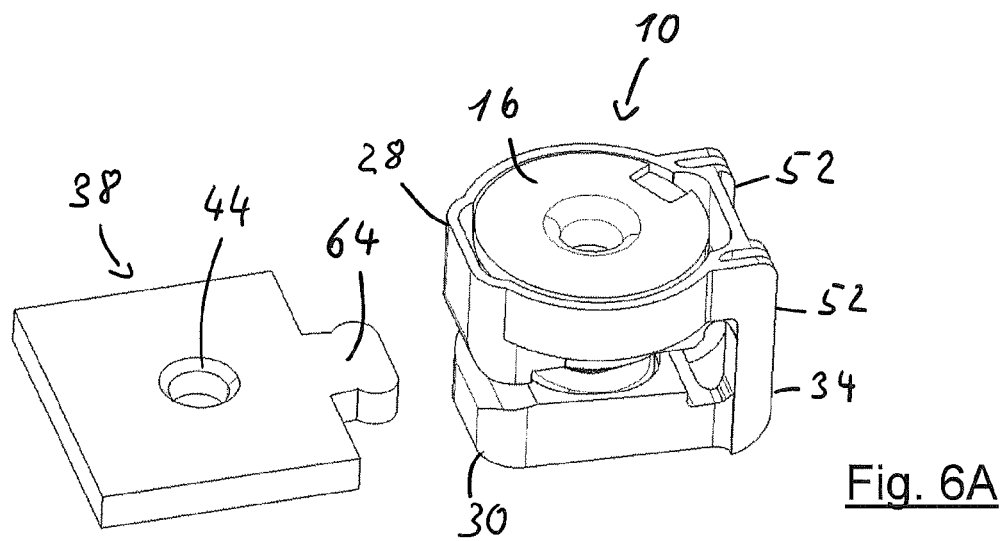
FIG. 6A a perspective view of a sixth embodiment of a tolerance compensation apparatus and of a component to be received therein.
Figure 6B:
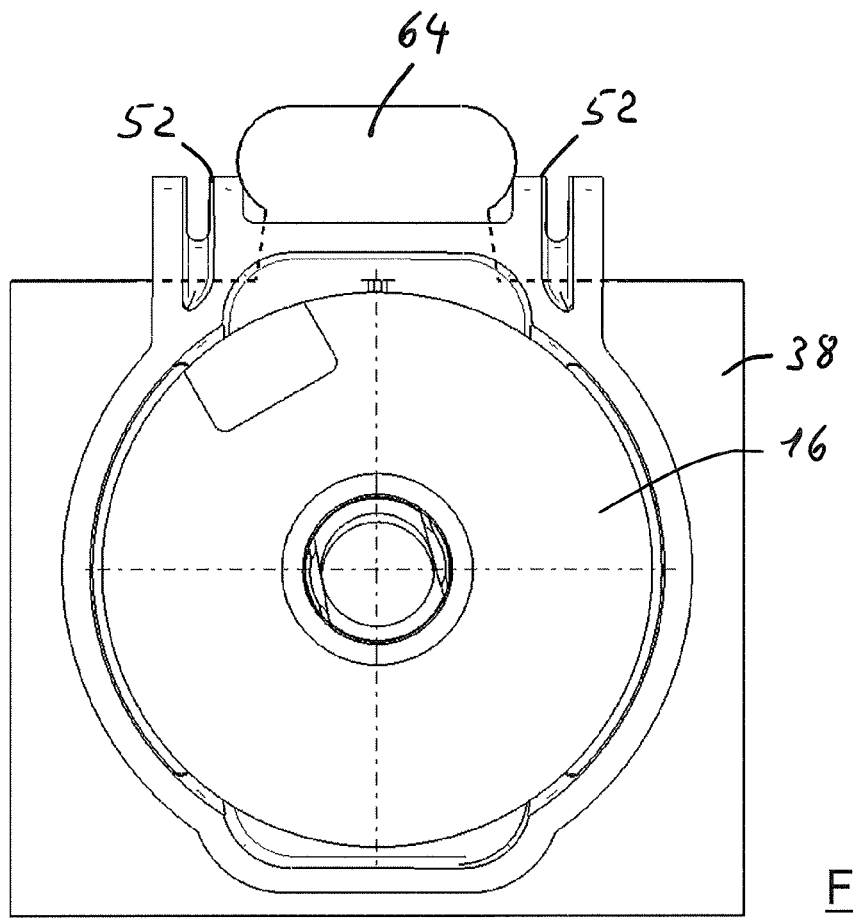
FIG. 6B a plan view of the tolerance compensation apparatus of FIG. 6A with the component received therein.

In FIGS. 6A and 6B, a sixth embodiment of a tolerance compensation apparatus 10 is shown that substantially differs from the above-described second embodiment in that the two connection webs 52 that are spaced apart in parallel and that define a window 54 between them form a securing element.

Accordingly, a latching anchor 64 facing in the direction of the introduction movement is formed in the region of the front end of the component 38 provided for the introduction into the reception gap 32. More precisely, the latching anchor 64 projects substantially in a perpendicular manner from an end face of the component 38. Viewed in the axial direction, i.e. in a plan view of the component 38, the latching anchor 64 can have a substantially T-shaped cross-sectional shape that comprises a longitudinal section projecting in a perpendicular manner from the end face of the component 38 and a transverse section that adjoins said longitudinal section, that extends perpendicular to the longitudinal section, and that extends in parallel with the end face.

The latching anchor 64 and the two spaced-apart connection webs 52 are adapted to one another such that, on the introduction of the component 38 into the reception gap 32, more precisely on the introduction of the latching anchor 64 into the window 54 formed by the connection webs 52, the transverse section of the latching anchor 64 pushes the connection webs 52 apart. As soon as the component 38 reaches its end position in the reception gap 32, i.e. is completely received in the tolerance compensation apparatus 10, the connection webs 52 snap back into their initial position behind the transverse section and engage behind the transverse section of the latching anchor 64, whereby the component 38 is secured in the tolerance compensation apparatus 10.

To facilitate the pushing apart of the two spaced-apart connection webs 52 of the connection section 34 during the introduction of the component 38 into the reception gap 32, the transverse section is rounded at its transverse ends.

It further applies that the greater the transverse dimension of the transverse section of the latching anchor 64 is and/or the less flexible the spaced-apart connection webs 52 are, the greater the force is that is required to push the latching anchor 64 between the connection webs 52. The maximum width of the transverse section of the latching anchor 64 and the flexibility of the connection webs 52 are therefore preferably selected such that both a problem-free introduction of the component 38 into the tolerance compensation apparatus and a secure anchoring of the latching anchor 64 to the connection section 34 are ensured.

It is understood that the different securing elements described above can each be implemented individually or in any desired combination with one another.

REFERENCE NUMERAL LIST 10 tolerance compensation apparatus
12 base element
14 internal thread
16 compensation element
18 external thread
20 passage
22 nut
24 spring element
26 holding element
28 first limb
30 second limb
32 reception gap
32a main region
32b end region
34 connection section
34a first connection part section
34b second connection part section
36 groove
38 component
40 recess
41 receiver
42 arrow
44 bore
46 end abutment
48 spring tongue
50 sawtooth latching
52 connection web
54 window
56 first latching tongue
57 second latching tongue
58 latch projection
60 latch opening
62 first latching wedge
63 second latching wedge
64 latching anchor
66 insert

The invention claimed is:

1. A system comprising a tolerance compensation apparatus and a component, the tolerance compensation apparatus comprising:
   a base element;
   a compensation element that is in threaded engagement with the base element and that defines a passage extending in an axial direction for receiving a screw element;

a nut into which the screw element can be screwed;

a holding element having a first limb configured to hold the base element, a second limb configured to hold the nut, and a connection section connecting the first and second limbs, wherein the first and second limbs are spaced apart from one another to define a reception gap for receiving the component; and at least one securing element configured to secure the component to the tolerance compensation apparatus upon the component being received in the reception gap, wherein the at least one securing element comprises an elastic latching tongue having a free end facing in the direction of the connection section, the latching tongue being configured to cooperate with a latch projection formed at the component, and wherein the latching tongue extends starting from the first limb into the reception gap.

2. The system in accordance with claim 1, wherein the at least one securing element is arranged in an entry region of the reception gap and/or in an end region of the reception gap.

3. The system in accordance with claim 1, wherein the second limb surrounds the nut such that the nut can be inserted into the second limb only in the axial direction.

4. The system in accordance with claim 1, wherein the reception gap has a T shape or an L shape viewed in a longitudinal section.

5. The system in accordance with claim 1, wherein the second limb completely surrounds the nut in a plane oriented at a right angle to the axial direction.

6. The system in accordance with claim 1, wherein the holding element is formed from a plastic material.

7. The system in accordance with claim 1, wherein the holding element is formed in one piece.

8. The system in accordance with claim 1, wherein the connection section is formed by two separate connection part sections.

9. The system in accordance with claim 8, wherein the connection part sections are displaceable in the axial direction relative to one another.

* * * * *